Figure 8:
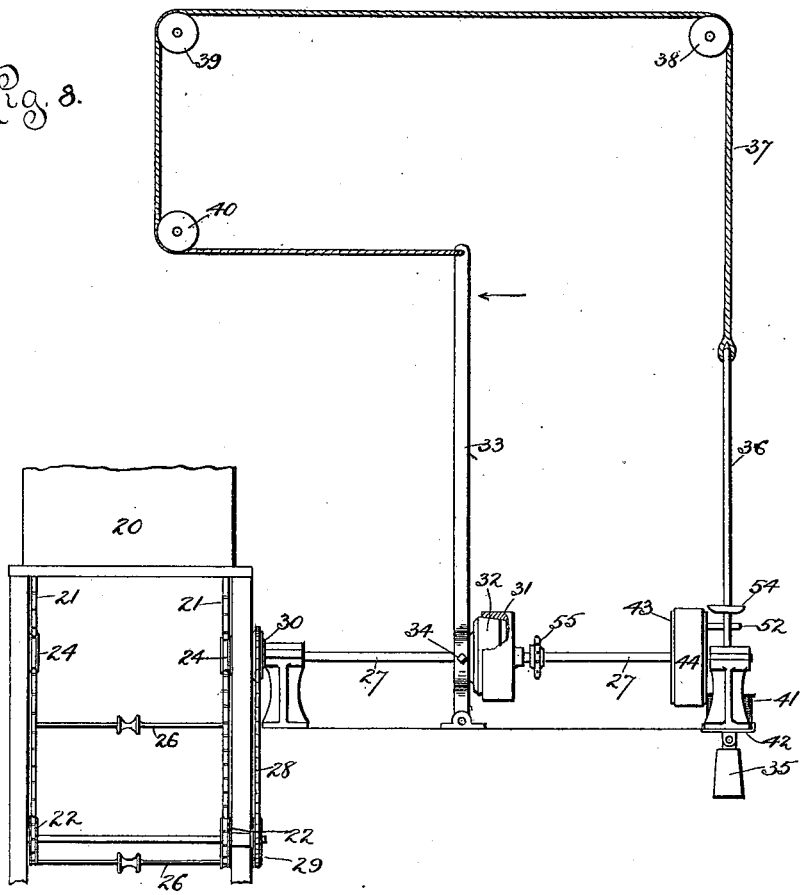

No. 644,592. Patented Mar. 6, 1900.
H. C. GARDNER.
STOP MECHANISM FOR HOG SCRAPING MACHINES.
(Application filed Apr. 20, 1898.)
(No Model.) 6 Sheets—Sheet 1.
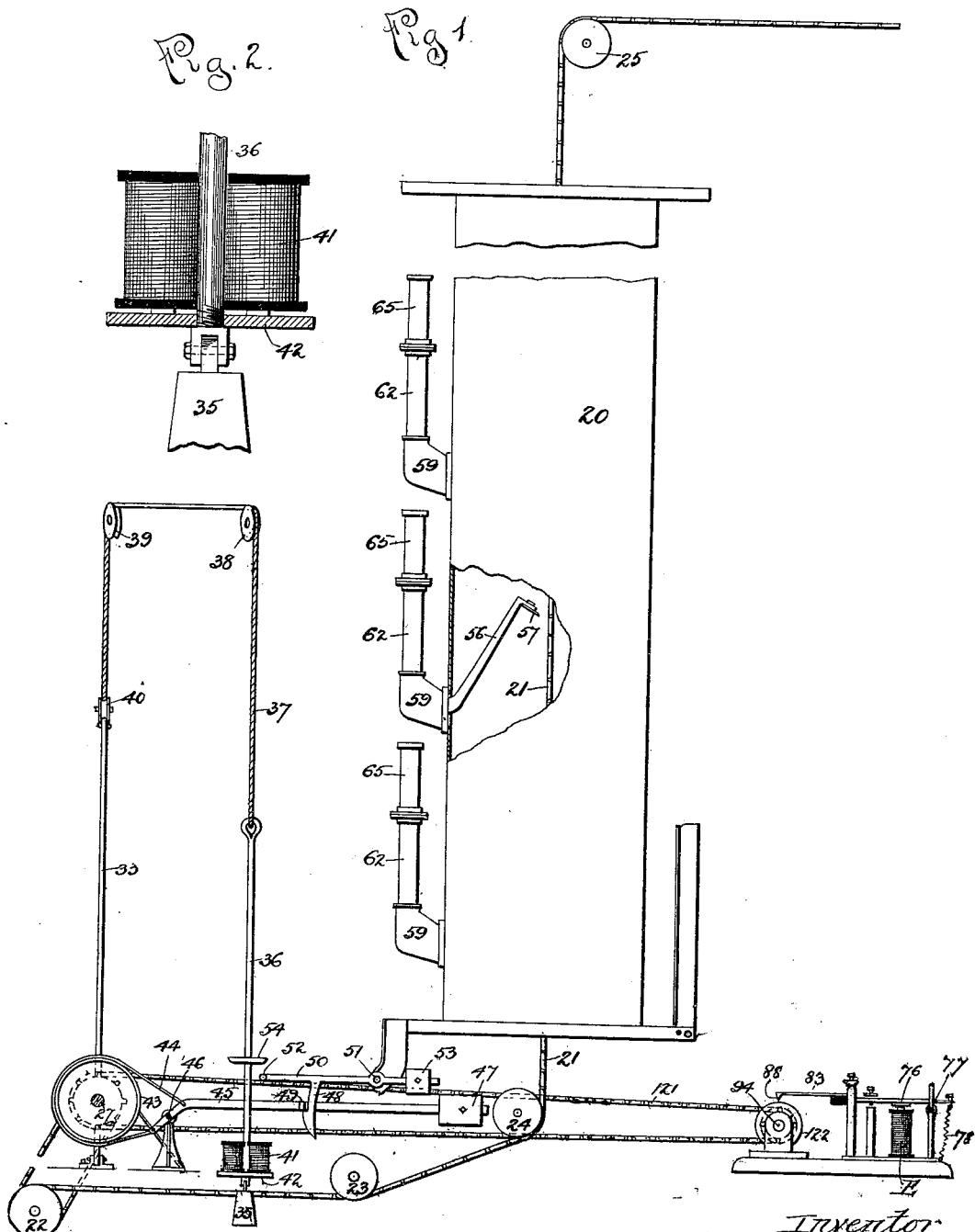

No. 644,592. Patented Mar. 6, 1900.
H. C. GARDNER.
STOP MECHANISM FOR HOG SCRAPING MACHINES.
(Application filed Apr. 20, 1898.)
(No Model.) 6 Sheets—Sheet 2.
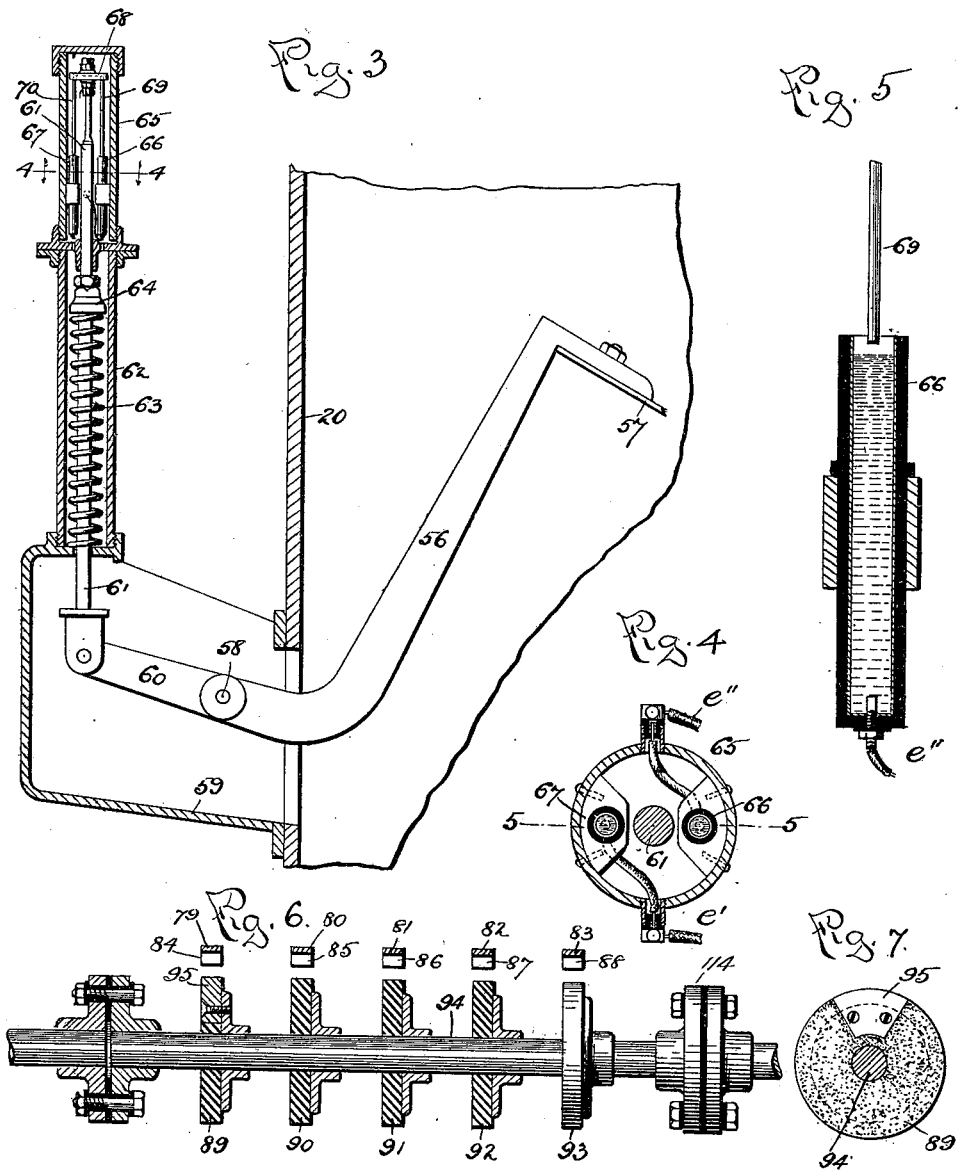

No. 644,592. Patented Mar. 6, 1900.
H. C. GARDNER.
STOP MECHANISM FOR HOG SCRAPING MACHINES.
(Application filed Apr. 20, 1898.)
(No Model.) 6 Sheets—Sheet 3.

No. 644,592. Patented Mar. 6, 1900.
H. C. GARDNER.
STOP MECHANISM FOR HOG SCRAPING MACHINES.
(Application filed Apr. 20, 1898.)
(No Model.) 6 Sheets—Sheet 4.

Witnesses
Inventor
Horace C. Gardner,

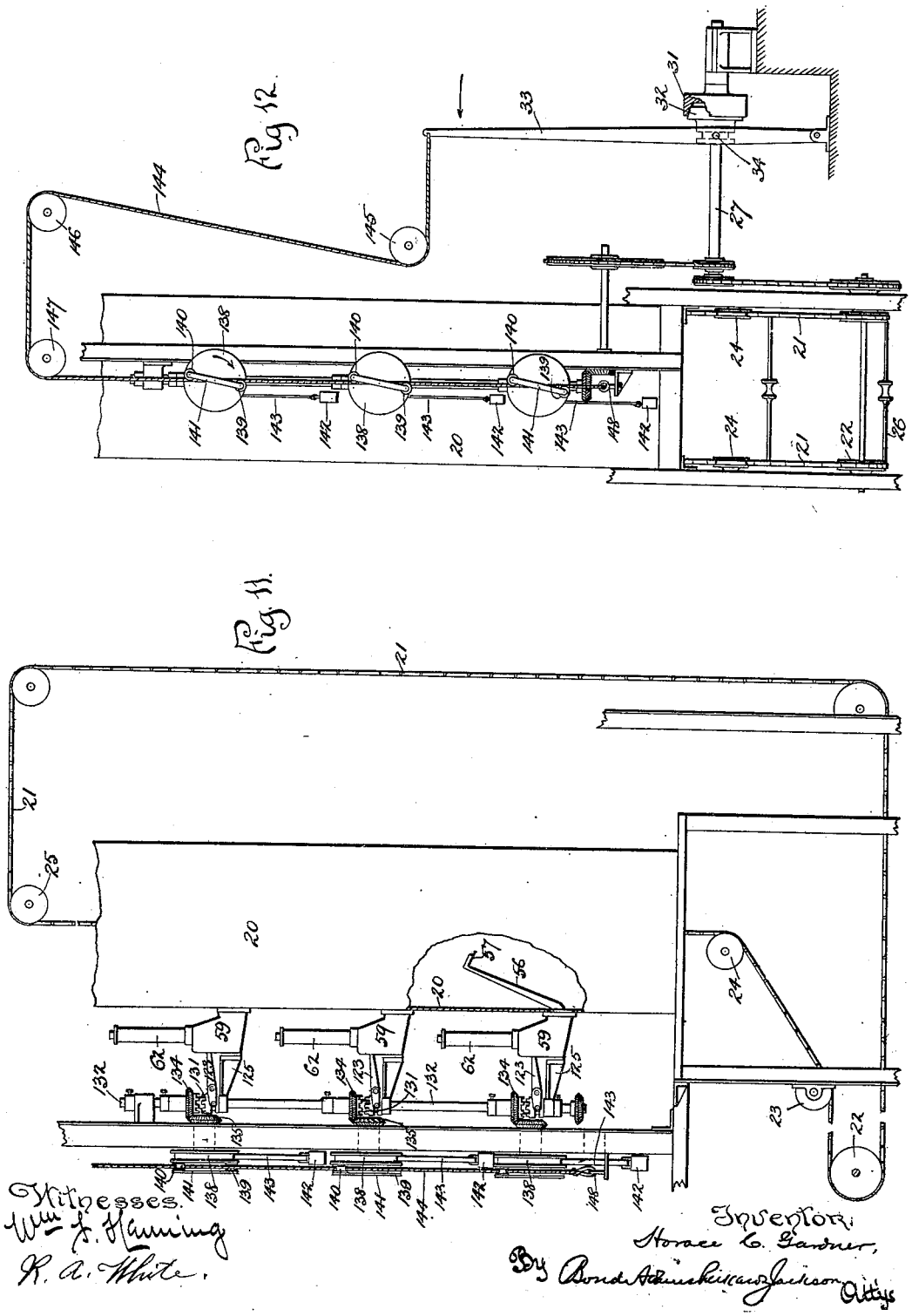

No. 644,592. Patented Mar. 6, 1900.
H. C. GARDNER.
STOP MECHANISM FOR HOG SCRAPING MACHINES.
(Application filed Apr. 20, 1898.)

(No Model.) 6 Sheets—Sheet 6

Witnesses:
Inventor
Horace C. Gardner,

UNITED STATES PATENT OFFICE.

HORACE C. GARDNER, OF CHICAGO, ILLINOIS, ASSIGNOR OF ONE-HALF TO GUSTAVUS F. SWIFT, OF SAME PLACE.

STOP MECHANISM FOR HOG-SCRAPING MACHINES.

SPECIFICATION forming part of Letters Patent No. 644,592, dated March 6, 1900.

Application filed April 20, 1898. Serial No. 678,267. (No model.)

*To all whom it may concern:*

Be it known that I, HORACE C. GARDNER, a citizen of the United States, residing at Chicago, in the county of Cook and State of Illinois, have invented certain new and useful Improvements in Automatic Stop Mechanism for Hog-Scraping Machines, of which the following is a specification, reference being had to the accompanying drawings.

My invention relates to hog-scraping machines employed for removing the hair from hogs after scalding, and has for its object to provide mechanism for automatically stopping such machines when a hog becomes caught in them.

I have illustrated and described my improvements as applied to a machine of the general type illustrated in Letters Patent of the United States to Cunning and Lowry, No. 377,353, dated January 31, 1888; but it should be understood that they may be applied to other forms of apparatus in which the scraping is accomplished by movable scrapers or equivalent devices.

In machines of the type illustrated the scraping apparatus consists of a cylinder or casing of sufficient size to permit of the passage of the hogs through it, which cylinder is arranged in a vertical position and has running through it an endless chain or carrier having cross-bars, from which are suspended the hogs by suitable hooks, the arrangement being such that as the carrier progresses the hogs suspended therefrom are carried up through the cylinder. Within the cylinder are a number of scrapers or knives carried by pivoted arms, which are adapted to swing inward and outward, the scraper-arms being supported in the wall of the cylinder. In order to scrape the entire carcass, the scraper-arms are arranged at different points in the wall of the cylinder and at different distances from its ends, so that as the hogs are carried along they are engaged by the different scrapers successively. It frequently happens in machines of this character that a hog becomes lodged in the cylinder either by the tearing out of the jaw or for some other reason, and unless the machine is immediately stopped the hogs on the carrier are apt to be cut to pieces and entirely ruined, and the machinery is also apt to be disarranged or broken when such accidents occur. It is therefore very desirable that means be provided for stopping the machine at once in case of accident, and such automatic stop mechanism constitutes the subject-matter of my invention. In the accompanying drawings I have illustrated two forms of apparatus for effecting this operation, one being by the use of electrical devices and the other by mechanical devices; but by the employment of either the same results are secured.

What I regard as new will be set forth in the claims.

Figure 9:
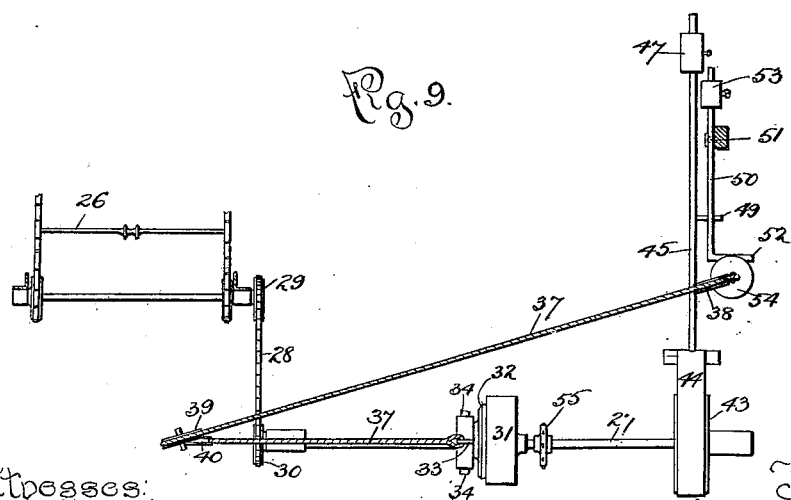
Figure 10:
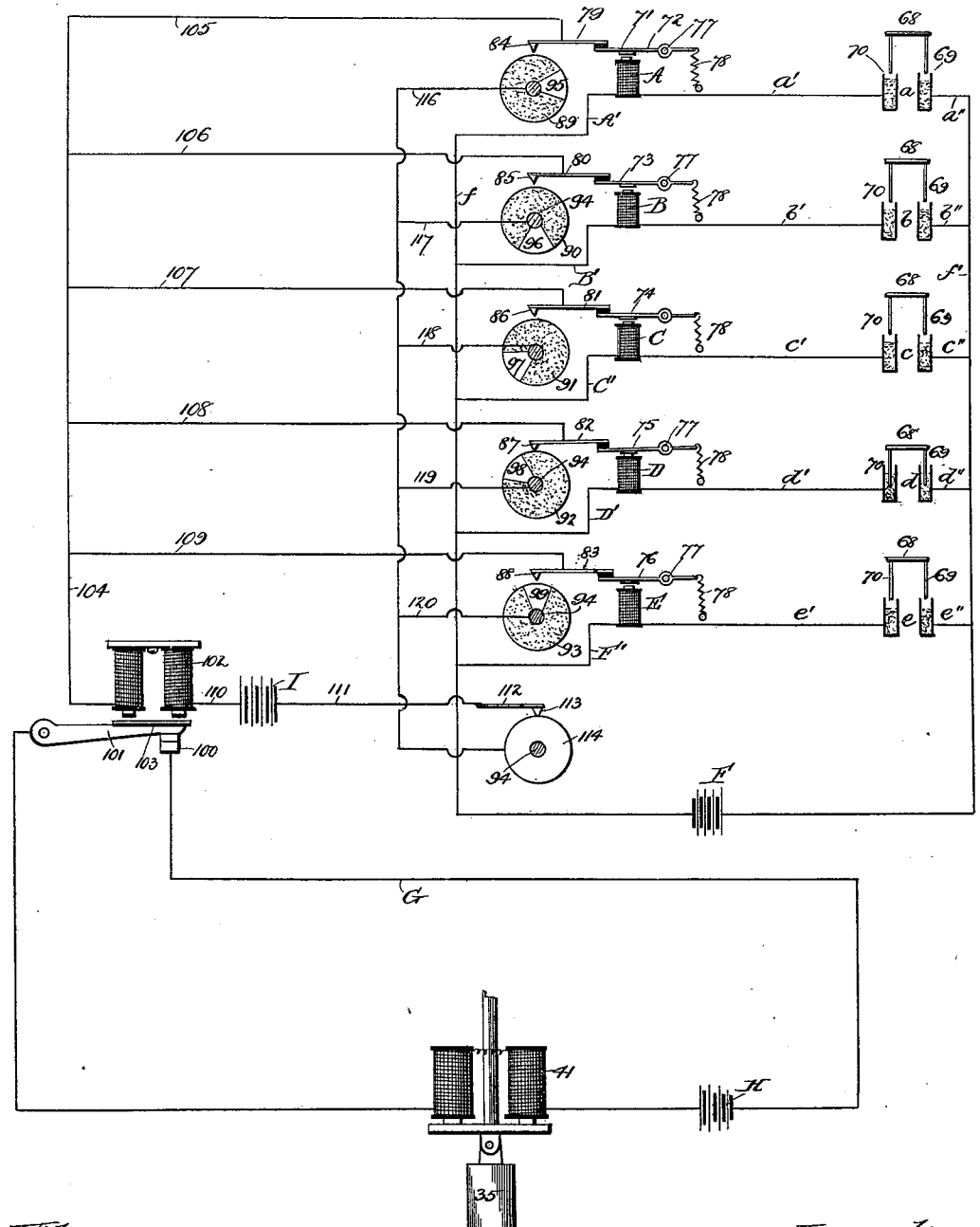
Figure 13:
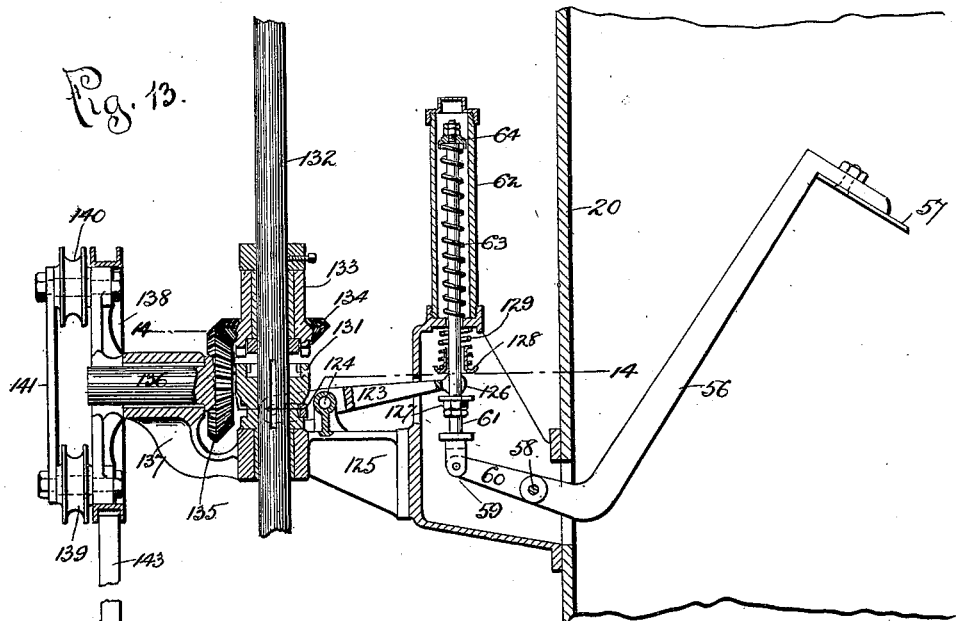
Figure 14:
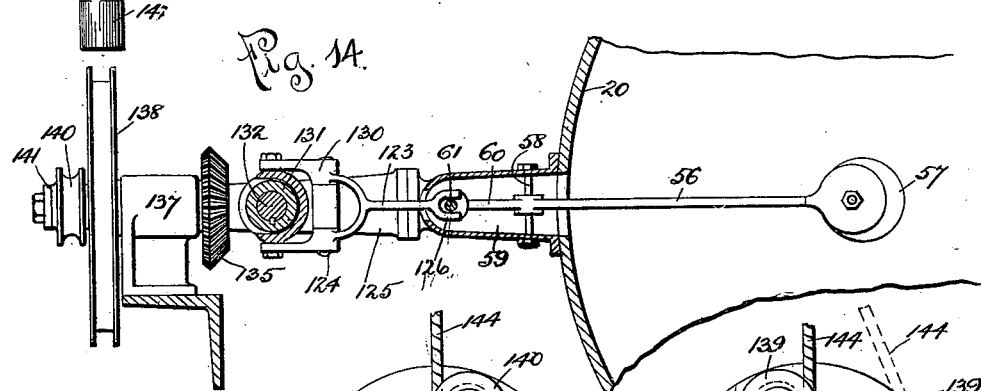
Figure 15:
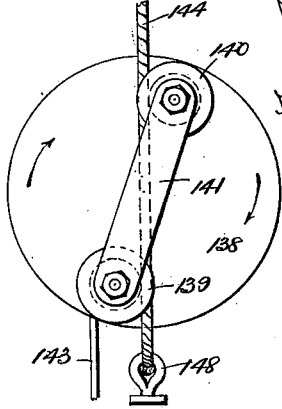
Figure 16:
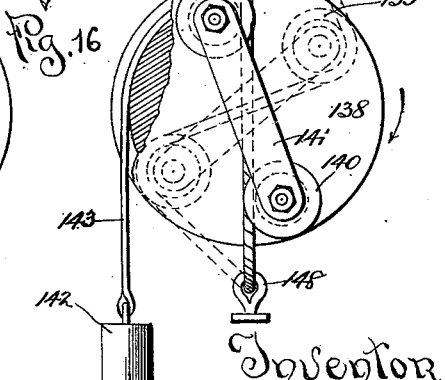

In the accompanying drawings, Figure 1 is a side elevation of the scraper-cylinder and certain other parts of the apparatus, part of the cylinder being broken away. Fig. 2 is a detail of one of the electromagnets. Fig. 3 is an enlarged sectional detail of one of the scraper-arms and circuit-closing devices operated thereby. Fig. 4 is an enlarged cross-section on line 4 4 of Fig. 3. Fig. 5 is an enlarged vertical sectional view of one of the mercury-cups, the section being taken on the line 5 5 of Fig. 4. Fig. 6 is a longitudinal section of a part of the circuit-closing devices. Fig. 7 is a side view of one of the circuit-closing disks. Fig. 8 is a side view of part of the stop mechanism. Fig. 9 is a plan view of the same. Fig. 10 is a diagrammatic view showing the arrangement of the circuits. Fig. 11 is a side elevation of the mechanically-operated stop mechanism. Fig. 12 is an end elevation of the same. Fig. 13 is a sectional detail showing the part of the apparatus for actuating the stop devices. Fig. 14 is a section on line 14 14 of Fig. 13. Figs. 15 and 16 are views showing different positions of the stop mechanism.

Referring to the drawings, 20 indicates the scraper-cylinder, and 21 the carrier for the hogs, which runs over pulleys 22 23 24 25 and other pulleys, (not shown,) the carrier being an endless chain. The carrier 21 carries a series of cross-bars 26, by which the hogs are suspended, as shown in Fig. 9. As shown in Figs. 1, 8, and 9, the carrier 21 is driven from a shaft 27 by a link belt 28, running over sprocket-wheels 29 30, the latter sprocket-wheel being mounted upon the shaft 27. The shaft 27 is in turn driven from a friction clutch-pulley 31, which is loosely mounted upon the shaft 27 and is driven from any suitable source of power. The motion of such clutch-section 31 is communicated to the shaft 27 by a clutch-section 32, which is mounted upon a feather on the shaft 27, so that it is free to move longitudinally thereof, but rotates therewith. As shown in Fig. 8, the clutch-section 32 is adapted to move into and out of engagement with the clutch-section 31. The clutch-section 32 is moved into and out of engagement with the clutch-section 31 by a lever 33, pivoted at its lower end upon a suitable support and connected by pins 34 to the clutch-section 32. The lever 33 is operated to move the clutch-section 32 out of engagement with the clutch-section 31 by a weight 35, which is connected to said lever 33 by a rod 36 and rope or other flexible connection 37. In the construction illustrated in Fig. 8 the rope 37 runs over pulleys 38 39 40 to provide for moving the lever 33 in the direction indicated by the arrow in Fig. 8; but it is evident that should the weight 35 be located at some other point some other arrangement of pulleys would be used. The weight 35 when operative, as above suggested, acts to throw the lever 33 to the left; but it is normally held out of operation by an electromagnet 41 and an armature 42, the armature 42 being connected to the rod 36, as shown in Fig. 2, the arrangement being such that when the armature 42 is attracted by the magnet 41 the weight 35 will be held suspended and inoperative. When, however, the electromagnet 41 is demagnetized, the weight 35 is permitted to drop, and thereby operates the lever 33 to disengage the clutch-sections 31 32 and stop the carrier 21.

In order to overcome the momentum of the apparatus and secure a quick stoppage of it, brake mechanism is provided which is automatically operated by the fall of the weight 35, said brake mechanism consisting of a brake-pulley 43, mounted upon the shaft 27, a brake-band 44, which encircles said pulley, as shown in Fig. 1, and a lever 45, to which the ends of the brake-band 44 are connected. As shown in Fig. 1, the lever 45 is mounted upon a pivot 46 near its inner end, and it carries at its outer end a weight 47, the tendency of which is to move the outer end of the lever downward and set the brake. The lever 45 is normally held up and the weight 47 supported by a latch 48, which engages a pin 49, carried by the lever, said latch being carried by a lever 50, as shown in Fig. 1. The lever 50 is mounted upon a pivot 51 and is provided with an arm 52 at one side of its pivot and with a weight 53 at the other side thereof.

54 indicates a disk carried by the rod 36 above the arm 52, said disk being adapted to strike the arm 52 when the weight 35 drops, and thereby rock the lever 50 in such manner as to throw the latch 48 out of engagement with the pin 49, thereby releasing the brake-lever 45 and permitting it to drop under the action of the weight 47, setting the brake upon the brake-pulley and at once stopping the carrier. The weight 53 serves to hold the latch 48 in position to reëngage the pin 49 as soon as the lever 45 is raised to its upper position.

55 indicates a sprocket-wheel which is mounted upon the shaft 27, as shown in Figs. 8 and 9, and serves to drive the circuit-closing devices, as will be hereinafter described.

56 indicates the scraper-arms, and 57 the scrapers carried thereby. As illustrated in Fig. 3, the scraper-arms 56 are mounted upon pivots 58, carried in brackets 59, secured to the outside of the cylinder 20. The scraper-arms 56 are further provided with outwardly-extending arms 60. The arm 60 of each scraper-arm is connected to a rod 61, which extends into a vertically-arranged spring-box 62, as shown in Fig. 3. Around the upper end of the rod 61, within said box, is a spring 63, which when the scraper 57 is moved back from the center of the cylinder by the passage of a hog is adapted to be compressed between the lower end of the spring-box and a head 64, secured upon the rod 61 above said spring. The adjustment of the parts is such that when a carcass passes up through the cylinder the scrapers as they come in contact with it are moved back a short distance and the springs 63 compressed, so that said springs act to hold the scrapers 57 yieldingly in contact with the carcass, as shown in Fig. 3.

Above the spring-box 62 is a casing 65, in which are carried two mercury-cups 66 67, as shown in Figs. 4 and 5, and the upper end of the rod 61 extends up into the casing 65 and carries at its upper end a cross-bar 68, from which depend rods 69 70, which are adapted to enter the mercury-cups, as indicated in Fig. 5. The rods 69 70 and the cross-bar 68 are insulated from the surrounding parts and are electrical conductors, so that when said rods move down into the mercury-cups and are immersed in the mercury therein contained an electrical connection is made between the two cups. The arrangement of the apparatus is such that when any scraper-arm 56 is moved back by the engagement of its scraper 57 with a carcass the rods 69 70 will be moved down far enough to penetrate the body of mercury in the cups 66 67, thereby forming the electrical connection described. When, however, the carcass passes beyond any given scraper, the arm which carries such scraper, being released, will fall inward under the action of its spring 63, thereby moving its arm 60 upward and carrying the rods 69 70 out of contact with the mercury in the cups, breaking the circuit.

For the purpose of actuating the stop mechanism at the proper time the mercury-cups of each scraper are connected to corresponding electromagnets in such manner that the circuit is closed through such electromagnets by the making of the connection between the two mercury-cups of the corresponding scraping device. This construction is illustrated in Fig. 10, wherein five pairs of mercury-cups and five corresponding electromagnets are shown, said electromagnets being indicated by the reference-letters A B C D E and the corresponding pairs of mercury-cups by a b c d e. As shown in said figure, the magnet A is connected with one of its mercury-cups by a wire a', and similarly the other magnets are connected with one of their mercury-cups, respectively, by wires b' c' d' e'. f f' indicate wires which connect with an electric battery F. A' B' C' D' E' indicate wires which connect magnets A B C D E with the wire f. a" b" c" d" e" indicate wires which connect the wire f' with one of the mercury-cups of each of the pairs a b c d e, respectively. The arrangement is such that when connection is made between the mercury-cups of any one pair the circuit will be closed through the corresponding electromagnet and the battery F, consequently energizing such magnet. For example, should the circuit be closed through the cups a the circuit will be closed through the magnet A and the battery F, energizing such magnet, and it is evident from the foregoing description that the different magnets A B C D E will be energized successively as a carcass is moved through the cylinder 20, owing to the fact that the different scraper-arms will thereby be thrown back, moving the rods 69 70, connected to them, into their respective mercury-cups and closing the circuit through the different magnets.

As illustrated in Fig. 10, each of the magnets A B C D E is provided with an armature 71, said armatures being carried by pivoted levers 72 73 74 75 76, respectively. Said levers are mounted upon pivots 77 and are provided with springs 78, which act to rock such levers in such manner as to move the armatures carried by them away from the poles of the different magnets when said magnets are not energized. The levers 72 73 74 75 76 also carry contact-arms 79 80 81 82 83, respectively, which arms are insulated from their respective levers and carry contact-points 84 85 86 87 88, respectively, as shown in Fig. 10. Said contact-points are adapted to move into and out of contact with the peripheries of a series of disks 89 90 91 92 93, respectively, all said disks being mounted upon a shaft 94, as indicated in Fig. 10 and as illustrated in Fig. 6. The peripheries of the disks 89 90 91 92 93 are for the most part either of non-conducting material or are insulated from the shaft 94. Each of said disks, however, is provided with a conducting-segment in electrical connection with the shaft 94, as illustrated in Fig. 10 and shown in connection with the disk 89 in Fig. 6. The conducting-segments of the different disks are indicated by reference-numerals 95 96 97 98 99, respectively. The adjustment of the apparatus is such that when the magnets A B C D E are inactive the contact-points 84 85 86 87 88 will lie a short distance from the peripheries of the disks 89 90 91 92 93, respectively; but when any one magnet is energized the attraction of its armature to it will rock the corresponding lever sufficiently to bring the corresponding contact-point into engagement with the periphery of the corresponding disk. For instance, if the electromagnet D is energized the lever 75 will be moved to the position shown in Fig. 10 and the contact-point 87 moved into engagement with the periphery of the disk 92. As indicated in Fig. 10, the electromagnet 41, which supports the operating-weight 35, is in a relay-circuit G, containing a battery H, said circuit being normally closed by a contact device 100 and a pivoted lever 101. The relay-circuit G is opened through the instrumentality of an electromagnet 102, which when energized attracts an armature 103, carried by the lever 101, thereby moving said lever out of contact with the contact-point 100, breaking the circuit, and it is for the purpose of opening and closing the circuit through the magnet 102 that the disks 89 90 91 92 93 and contact-points 84 85 86 87 88 are provided. As illustrated in Fig. 10, the magnet 102 is connected by a wire 104 to a series of wires 105 106 107 108 109, which connect said magnet, respectively, with the contact-points 84 85 86 87 88. The magnet 102 is also connected by a wire 110 to a battery I, and said battery is connected by a wire 111 to an arm 112, which carries a contact-point 113, which in turn bears upon the periphery of a metal disk 114, mounted upon the shaft 94 and in electrical connection therewith. In the diagram wires 116 117 118 119 120 are shown as connecting the sectional parts of the shaft 94; but this is merely to illustrate the connection, and it will be understood that in practice the shaft 94 is as illustrated in Fig. 6.

From the above description it will be noted that the circuit through the battery I and magnet 102 is open except when one of the contact-points 84 85 86 87 88 is in contact with the conducting-segment of its disk, as at other times the circuit is open either by reason of the fact that the different contact-points 84 85 86 87 88 are out of contact with the peripheries of their respective disks or are in contact with the non-conducting portions of the peripheries of such disks.

The shaft 94 is caused to rotate uniformly with the movement of the carrier 21 by a link belt 121, which is driven by the sprocket-wheel 55 upon the shaft 27 and passes around a sprocket-wheel 122, mounted upon the shaft 94, as shown in Fig. 1. The arrangement is such that the shaft 94 makes one rotation while the carrier 21 is moving the distance from one cross-bar 26 to the next. It will be noted that when any one of the magnets A B C D E is energized, moving the appropriate contact-point into contact with the periphery of the corresponding disk, if such magnet remains energized a sufficient length of time the conducting-segment of such disk will at length move into contact with such contact-point, and the circuit will be closed through the magnet 102, thereby opening the relay-circuit G, deënergizing the magnet 41, and dropping the weight, thereby stopping the machine. For instance, in Fig. 10 the magnet D is shown as being energized, its contact-point 87 being in contact with the periphery of the disk 92. Now if the magnet D is not deënergized before the segment 98 of the disk 92 moves into contact with the contact-point 87 a circuit will be established over wires 108 and 104 to magnet 102, thence over wire 110 to battery I, thence over wire 111 to arm 112, and through contact-point 113 to disk 114, thence to shaft 94, through said shaft to segment 98, and back to the contact-point 87. The magnet 102 will thereby be energized and the machine stopped, as above described.

The position of the different segments 95 96 97 98 99 with reference to the rest of the apparatus is so adjusted that under normal conditions the rotation of the shaft 94 will carry the segment which coöperates with a given scraper-arm a short distance past the corresponding contact-point before the pressing back of such scraper-arm will close the circuit through the corresponding magnet and move such contact-point into engagement with the periphery of the disk in which such segment is carried and that the scraper-arm will be released by the passage of the carcass beyond it a sufficient length of time before the segment is carried around to the contact-point again to insure the demagnetization of the electromagnet, and consequently the movement of the contact-point away from the disk, thereby preventing the closing of the circuit through the magnet 102 and the dropping of the weight 35, which would result from the magnetization of such magnet. Owing to the fact that the different scraper-arms do not simultaneously engage the carcass, but come into operation successively, it is evident that the different segments 95 96 97 98 99 must be arranged spirally around the shaft 94, so that the different circuit-closing devices may operate properly. Whenever a scraper-arm remains back out of its normal position an extraordinary length of time, the corresponding contact-point will contact with the appropriate segment, and the circuit being thereby closed through the magnet 102 the weight 35 will be dropped and the machine stopped, the brake 44 overcoming the momentum of the machine and effecting a practically-instantaneous stoppage of it.

In the form of apparatus shown in Fig. 11 and the succeeding figures mechanical instead of electrical devices are employed for stopping the machine. In the construction illustrated in said figures the scraper-arms are mounted in the same way as before; but instead of providing the rods 61 with the circuit-closing devices each of said rods is connected by a lever 123, mounted upon a suitable pivot 124, carried by a bracket 125, as shown in Fig. 13. One end of the lever 123 carries a fork 126, which embraces the rod 61 above a collar 127, as shown. Above the fork 126 is a sleeve 128, and between said sleeve and the lower end of the box 62 is a spring 129, mounted upon the rod 61, by which construction when the scraper-arm 56 is thrown back by the passage of a carcass, as hereinbefore described, the downward movement of the rod 61 thereby effected will allow the spring 129 to move the fork 126 downward, rocking the lever 123. The opposite end of the lever 123 is connected by a fork 130 to a clutch-section 131, mounted upon a feather on a vertically-disposed shaft 132, as shown in Figs. 11, 13, and 14. The clutch-section 131 is adapted to engage a clutch-section 133, which is loosely mounted upon the shaft 132 and carries a beveled gear 134. The beveled gear 134 meshes with a beveled gear 135, mounted upon a stud 136, journaled in a suitable bracket in a bearing 137, as shown in Figs. 13 and 14. 138 indicates a pulley which is mounted upon the stud 136 and keyed thereto. 139 140 indicate grooved rollers which are mounted upon the outer face of the pulley 138 at diametrically-opposite points near its periphery, as shown in Figs. 13 and 15. 141 indicates a brace-rod connecting the spindles of the rollers 139 140, as also shown in Figs. 13 and 15. 142 indicates a weight connected by a strap 143 to the periphery of the pulley 138, said weight serving to restore said pulley to its normal position after it has been rotated, as hereinafter described. 144 indicates a rope or other flexible connection which is connected to the upper end of the lever 33, which operates the clutch-section 32, as hereinbefore described, and passes around pulleys 145 146 147, the latter pulley being arranged above the cylinder 20 substantially in line with the pulleys 138 of the different scraper-arms, as shown in Figs. 11 and 12. From the pulley 147 the rope 144 passes down over the outer face of each pulley 138 between the upper and lower rollers 139 140, as shown in Figs. 12 and 15, and is attached at its lower end to a fixed stop 148, as shown in Figs. 12 and 15. By this construction, as will be evident, when the rope 144 is pulled the lever 33 will be moved to the left, as shown in Fig. 12, and the clutch-section 32 moved out of engagement with the clutch-section 31, thereby stopping the machine. The operation of this form of apparatus is as follows: Under normal conditions the position of the scraper-arm 56 is as shown in Fig. 13, the clutch-section 131 being then out of engagement with the clutch-section 133. When, however, a carcass engages any one of the scraper-arms 56, such arm is thrown back, as hereinbefore described, thereby drawing down the rod 61 and effecting the rocking of the lever 123, thereby throwing the clutch-section 131 into engagement with the clutch-section 133. In order to prevent breakage, should the clutch-sections not come together properly at first, the spring 129 is provided, which permits the lever 123 to yield as much as may be necessary to prevent breakage of the parts. As soon as the clutch-sections 131 to 133 become engaged the rotation of the shaft 132, which may be effected from any suitable source of power, causes the beveled pinion 135 to rotate, thereby rotating the pulley 138. The rotation of the pulley 138 is in the direction indicated by the arrows in Figs. 15 and 16, and consequently when said pulley commences to rotate the rollers 139 and 140 will at first move away from the rope 144. When, however, about one-half of a rotation has been effected, the rollers 139 and 140 will have been moved to the position shown in Fig. 16, at which time they will engage the rope 144 at the opposite sides from their original position. Continued rotation of the pulley 138 will cause deflection of the rope 144 in the manner indicated in dotted lines in Fig. 16, thereby pulling it sufficiently to operate the lever 33 and separate the clutch-sections 31 and 32. The adjustment is such that under normal conditions the pulley 138 will not rotate more than through an arc of about one hundred and twenty degrees while a carcass is passing any given scraper. Consequently under such conditions the rope 144 will not be pulled. If, however, a carcass should become stuck opposite any scraper, the pulley 138, operated thereby, will continue to rotate to a sufficient extent to effect the deflection and consequent pulling of the rope, thereby stopping the machine, as hereinbefore described. The weight 142 serves to return the pulley 138 to its normal position after each movement thereof.

From the foregoing description it will be noted that by either form of the apparatus described herein the stoppage of the carrier is automatically and practically instantaneously effected whenever a carcass becomes lodged in the scraper-cylinder as well as when any one of the scraper-arms fails to return to its normal position after the passage of a carcass. All danger of damage to the machine and to the carcasses from such causes is therefore entirely eliminated. It should be noted, further, that the stoppage of the machine, effected as described, in effect gives an alarm to the operator, so that he understands that something is wrong and may proceed to investigate, and I wish it to be understood that while my invention in its more complete form embodies the automatic stoppage of the machine, as described, yet it includes a more limited application, such as the provision of a bell or other device intended solely to alarm the operator and enable him to stop the machine by other means. My claim, therefore, includes all such forms of apparatus.

I have described my improved machine in detail; but it should be understood that I do not restrict myself to the specific details shown and described except in so far as I have claimed them specifically, as various modifications may be made without departing from my invention.

That which I claim as my invention, and desire to secure by Letters Patent, is—

1. In a scraping apparatus, the combination with scraping mechanism, of means for carrying the object to be scraped past the scraping mechanism, and means actuated by abnormal action of the scraping mechanism for automatically stopping the carrying mechanism, substantially as described.

2. In a scraping apparatus, the combination with scraping mechanism, of means for carrying the object to be scraped past the scraping mechanism, and means operated by the lodgment in the scraping mechanism of one of the objects under treatment for automatically stopping the carrying mechanism, substantially as described.

3. In a scraping apparatus, the combination with a plurality of scrapers adapted to be moved by the passage of a carcass, and a carrier adapted to convey carcasses past such scrapers, of means for automatically stopping the carrier when a scraper is held out of its normal position for an unusual length of time, substantially as described.

4. In a scraping apparatus, the combination with a plurality of scrapers, of a carrier adapted to convey carcasses past such scrapers, and means actuated by the engagement of any one of said scrapers with a carcass for an abnormal length of time to stop the carrier, substantially as described.

5. In a scraping apparatus, the combination with scraping mechanism, and means for conveying objects to be scraped past such scraping mechanism, of means actuated by the lodgment of any one of said objects in said scraping mechanism for automatically giving an alarm, substantially as described.

6. In a scraping apparatus, the combination with a plurality of movable scrapers, of means for conducting objects to be scraped into engagement with such scrapers, thereby moving them out of their normal position, and means automatically operated by the movement of a scraper for giving an alarm when such scraper remains out of its normal position an extraordinary length of time, substantially as described.

7. In a scraping apparatus, the combination with a plurality of movable scrapers, of means for conducting objects to be scraped into engagement with such scrapers, thereby moving them out of their normal position, and means automatically operated by the movement of a scraper for stopping the apparatus when such scraper remains out of its normal position an extraordinary length of time, substantially as described.

8. In a scraping-machine, the combination with a cylinder, and a plurality of movable scrapers mounted therein, of a carrier adapted to convey carcasses past such scrapers in such manner as to move the scrapers out of their normal position while a carcass is passing them, and automatic mechanism for giving an alarm when any one of the scrapers remains out of its normal position an extraordinary length of time, substantially as described.

9. In a scraping-machine, the combination with a cylinder, and a plurality of movable scrapers mounted therein, of a carrier adapted to convey carcasses past such scrapers in such manner as to move the scrapers out of their normal position while a carcass is passing them, and automatic mechanism for stopping the carrier when any one of the scrapers remains out of its normal position an extraordinary length of time, substantially as described.

10. In a scraping-machine, the combination with a cylinder, and a plurality of movable scrapers mounted therein, of a carrier adapted to convey carcasses past such scrapers in such manner as to move the scrapers out of their normal position while a carcass is passing them, automatic mechanism for stopping the carrier when any one of the scrapers remains out of its normal position an extraordinary length of time, and automatic brake mechanism for overcoming the momentum of the machine, substantially as described.

11. A scraping apparatus, having scraping devices, means for causing the scraping devices to traverse the object to be scraped, auxiliary mechanism for giving an alarm and means controlled by the operation of the scraping devices for automatically actuating said auxiliary mechanism when said scraping devices act abnormally, substantially as described.

HORACE C. GARDNER.

Witnesses:
JOHN L. JACKSON,
JULIA M. BRISTOL.